W. ACKERMAN.
SPRING WHEEL FOR VEHICLES.
APPLICATION FILED DEC. 16, 1908.

946,091.

Patented Jan. 11, 1910.
2 SHEETS—SHEET 1.

Witnesses
F. C. Gibson.
C. Bradway.

Inventor
William Ackerman
By Victor J. Evans
Attorney

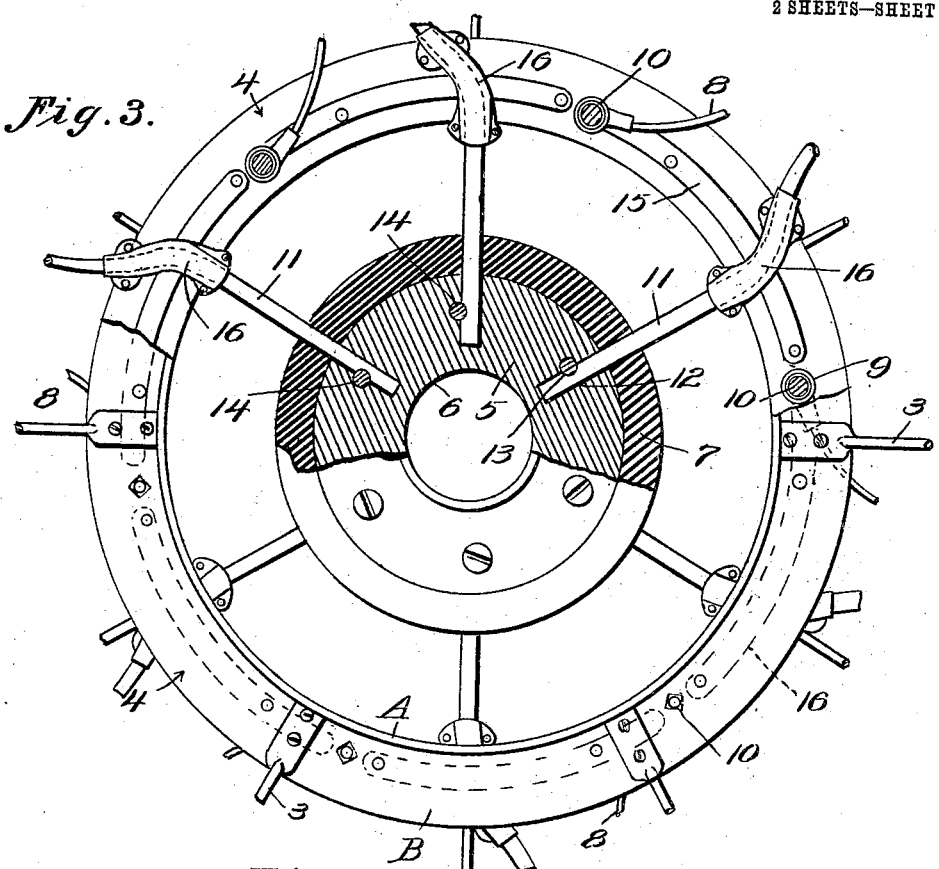
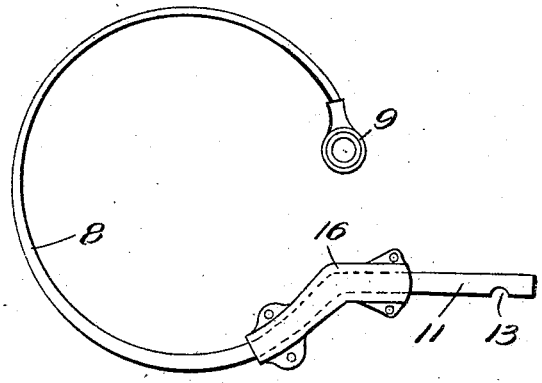

UNITED STATES PATENT OFFICE.

WILLIAM ACKERMAN, OF SAPULPA, OKLAHOMA.

SPRING-WHEEL FOR VEHICLES.

946,091.

Specification of Letters Patent. Patented Jan. 11, 1910.

Application filed December 13, 1908. Serial No. 467,816.

*To all whom it may concern:*

Be it known that I, WILLIAM ACKERMAN, a citizen of the United States, residing at Sapulpa, in the county of Creek and State of Oklahoma, have invented new and useful Improvements in Spring-Wheels for Vehicles, of which the following is a specification.

This invention relates to a wheel intended for bicycles, automobiles or other vehicles, and relates more particularly to a wheel having springs interposed between the hub and felly to provide the necessary resiliency and at the same time dispense with the necessity of pneumatic or other expensive tires.

The invention has for one of its objects to improve and simplify the construction of wheels of this character so as to be comparatively simple and inexpensive to manufacture, reliable and efficient in use, and possessing good wearing qualities.

Another object of the invention is the provision of a wheel composed of a felly and a hub section with a novel arrangement of springs between them.

With these objects in view and others, as will appear as the description proceeds, the invention comprises the various novel features of construction and arrangement of parts which will be more fully described hereinafter and set forth with particularity in the claims appended hereto.

Figure 1:
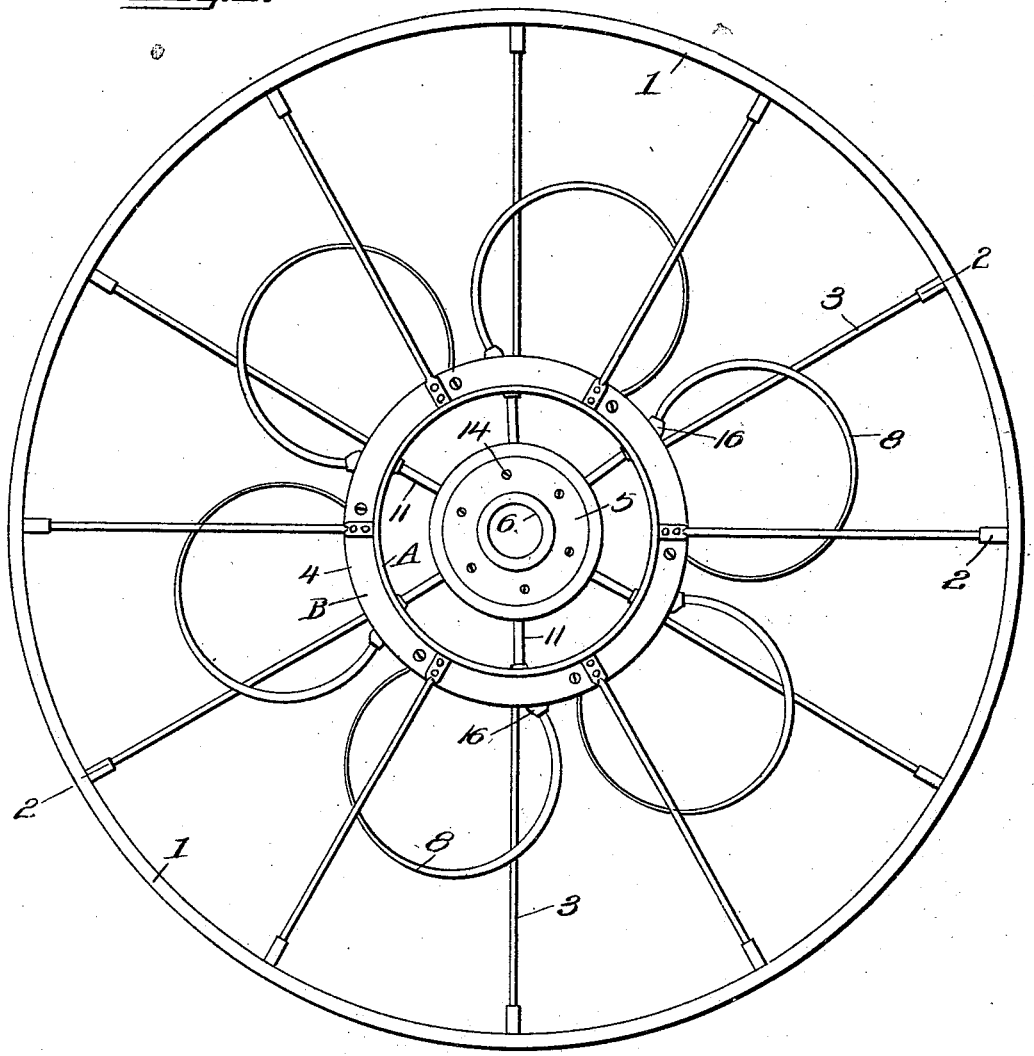
Figure 2:
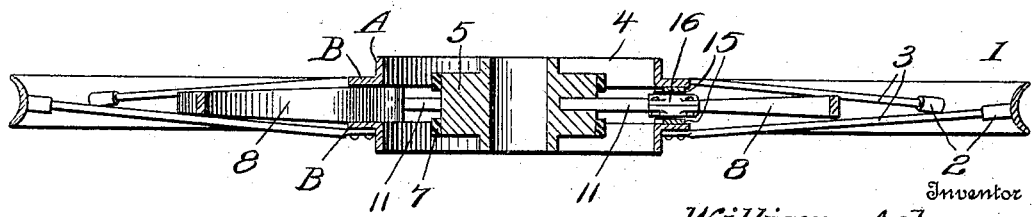

In the accompanying drawing, which illustrates one embodiment of the invention, Figure 1 is a side view of the wheel. Fig. 2 is a transverse section thereof. Fig. 3 is a fragmentary side elevation with portions in section of the central part of the wheel. Fig. 4 is a detail view of one of the springs of the wheel.

Similar reference characters are employed to designate corresponding parts throughout the views.

Referring to the drawing, 1 designates the felly of the wheel which may be formed as shown in Fig. 2 to receive a rubber tire. The felly is provided with spoke nipples 2 to which are connected the two sets of spokes 3 that are respectively secured to rings 4, the said rings being of angular cross section and arranged with webs A at a right angle to the plane of the wheel and with webs B in the plane of the wheel. The parts thus far described, constitute one section of the wheel which is adapted to move with respect to the other or hub section. This hub section consists of an annular body or hub 5 having an opening 6 for receiving an axle and around the hub are bands 7 of rubber on which the rings 4 are adapted to bear when the wheel is under extreme load to act as buffers to prevent excessive strain on the springs.

The springs 8 are approximately circular and gradually diminish in thickness for obtaining the desired resiliency, the free ends of the springs being fitted with eye pieces 9 for receiving bolts 10 that fasten the free ends of the springs to the rings 4 of the outer section of the wheel. The other ends of the springs are formed into radially-disposed spokes 11 that are set into sockets 12 in the hub 5, the root portion of the spokes being notched at 13 for receiving bolts or keys 14 that prevent the spokes from pulling out. The springs are disposed between the rings 4 and felly 1 of the wheel and the spoke portions 11 of the springs pass between the rings 4. The rings 4 are provided with arcuate wear plates 15 and the spoke portions 12 have wear pieces 16 each composed of two parts bolted together so as to rub on the plates 15 during the relative movement of the parts. These wear plates 15 and wear pieces 16 can be removed for substituting new ones when occasion requires. A wheel of this character is of substantial and durable design and provides for the necessary resiliency to insure comfortable running of the vehicle.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim is:—

1. In a spring wheel of the character described, the combination of a hub, an annular member comprising complemental parts transversely spaced, spring elements comprising spoke portions and approximately circular spring portions, the inner ends of the spoke portions being secured to the hub and their outer ends passing between the parts of the annular member and the extremities of the circular spring portions being secured between the parts of the annular member, and reinforcements secured to the spring elements at the juncture of the spoke and spring portions thereof to stiffen and brace said elements and to form wear resisting devices.

2. In a spring wheel, the combination of a hub, an annular member comprising transversely spaced rings of like size, and construction, each of said rings comprising angularly disposed webs, a felly, spokes secured at their outer ends to the felly and at their inner ends to the webs of the said rings in the plane of the wheel, and spring elements comprising spoke portions and approximately circular spring portions and located between the spokes and the said rings, the inner ends of said spoke portions being secured to the hub, and the outer portions of said spoke portions passing between said rings and in loose engagement therewith, and having the extremities of said spring portions secured between the webs of the rings to which the inner ends of the spokes are attached.

In testimony whereof I affix my signature in presence of two witnesses.

WILLIAM ACKERMAN.

Witnesses:
FRED G. LIADY,
JOHN F. CONLEY.